(12) United States Patent
Cohen et al.

(10) Patent No.: US 9,616,782 B2
(45) Date of Patent: Apr. 11, 2017

(54) CAR SEAT VEHICLE CONNECTION SYSTEM, APPARATUS, AND METHOD

(71) Applicant: Pidyon Controls Inc., New York, NY (US)

(72) Inventors: Yochanan Cohen, New York, NY (US); Velissa Van Scoyoc, Philadelphia, PA (US)

(73) Assignee: PIDYON CONTROLS INC., New York, NY (US)

( * ) Notice: Subject to any disclaimer, the term of this patent is extended or adjusted under 35 U.S.C. 154(b) by 0 days.

(21) Appl. No.: 14/838,873

(22) Filed: Aug. 28, 2015

(65) Prior Publication Data

US 2016/0059744 A1   Mar. 3, 2016

Related U.S. Application Data (60) Provisional application No. 62/043,955, filed on Aug. 29, 2014.

(51) Int. Cl.
*B60N 2/28* (2006.01)

(52) U.S. Cl.
CPC ................... *B60N 2/2806* (2013.01)

(58) Field of Classification Search
CPC .. B60N 2/2806; B60N 2/2821; B60N 2/2887; B60N 2/289; B60N 2/2893
See application file for complete search history.

(56) References Cited

U.S. PATENT DOCUMENTS

| | | | |
|---|---|---|---|
| 2,911,652 A | 11/1959 | Ekman | |
| 3,015,104 A | 1/1962 | Crosson et al. | |
| 3,023,134 A | 2/1962 | Creswell et al. | |
| 3,174,155 A | 3/1965 | Pitman | |
| 3,320,619 A | 5/1967 | Latsnik et al. | |
| 3,479,666 A | 11/1969 | Webb | |
| 3,577,562 A | 5/1971 | Holt | |
| 3,818,508 A | 6/1974 | Lammers | |
| 3,906,546 A | 9/1975 | Gooding | |

(Continued)

FOREIGN PATENT DOCUMENTS

EP   1953035   8/2008

OTHER PUBLICATIONS

Children, NHTSA Traffic Safety Facts, 2003, National Center for Statistics and Analysis, DOT HS 809 762.

(Continued)

*Primary Examiner* — Philip Gabler
(74) *Attorney, Agent, or Firm* — Gordon & Jacobson, P.C.

(57) ABSTRACT

A car seat connection system for connecting the car seat to a vehicle is provided. The system includes at least one strap, each having a first connector at a respective first end of said strap and a second connector at a respective second end of said strap. The first connector is configured to removably connect to the car seat and the second connector is configured to removably connect to a car seat anchor of the vehicle. The seat connector and the first connector may be seatbelt connectors of opposite gender. The second connector may be a LATCH or ISOFIX connector. A method is provided for removably connecting the car seat to the vehicle. The method includes connecting the first connector to the seat connector of the car seat and connecting the second connector to the car seat anchor of the vehicle.

4 Claims, 8 Drawing Sheets

(56) References Cited

U.S. PATENT DOCUMENTS

| | | | |
|---|---|---|---|
| 4,101,983 A | 7/1978 | Dera et al. | |
| 4,106,124 A | 8/1978 | Green | |
| 4,345,338 A | 8/1982 | Frieder, Jr. et al. | |
| 4,484,364 A | 11/1984 | Mitchell et al. | |
| 4,599,752 A | 7/1986 | Mitchell | |
| 4,845,786 A | 7/1989 | Chiarella | |
| 4,913,490 A * | 4/1990 | Takahashi | B60N 2/2821 297/130 |
| 4,937,888 A | 7/1990 | Straus | |
| 4,972,527 A | 11/1990 | Wallace | |
| 5,018,220 A | 5/1991 | Lane et al. | |
| 5,204,998 A | 4/1993 | Liu | |
| 5,259,071 A | 11/1993 | Scott et al. | |
| 5,409,294 A | 4/1995 | Czernakowski | |
| 3,186,004 A | 6/1995 | Carlini | |
| 5,466,044 A | 11/1995 | Barley et al. | |
| 5,475,878 A | 12/1995 | Dawn et al. | |
| 5,611,596 A | 3/1997 | Barley et al. | |
| 5,630,645 A | 5/1997 | Lumley et al. | |
| 5,638,544 A | 6/1997 | Sump | |
| 5,680,656 A | 10/1997 | Gath | |
| 5,724,681 A | 3/1998 | Sykes | |
| 5,845,968 A | 12/1998 | Lovie | |
| 5,916,828 A | 6/1999 | Messner | |
| 5,930,840 A | 8/1999 | Arai | |
| 5,947,552 A | 9/1999 | Wilkins et al. | |
| 5,951,102 A | 9/1999 | Poulson et al. | |
| 5,956,777 A | 9/1999 | Popovich | |
| 5,961,180 A | 10/1999 | Greger et al. | |
| 5,979,982 A * | 11/1999 | Nakagawa | B60N 2/286 297/250.1 |
| 5,997,086 A | 12/1999 | Gibson et al. | |
| 5,997,098 A | 12/1999 | Coffeen | |
| 6,017,088 A | 1/2000 | Stephens et al. | |
| 6,027,163 A | 2/2000 | Longenecker | |
| 6,032,297 A | 3/2000 | Barthold et al. | |
| 6,048,028 A | 4/2000 | Bapst | |
| 6,070,890 A | 6/2000 | Haut et al. | |
| 6,079,780 A | 6/2000 | Bapst | |
| 6,082,814 A | 7/2000 | Celestina-Krevh et al. | |
| 6,139,101 A | 10/2000 | Berringer et al. | |
| 6,155,638 A | 12/2000 | Bapst | |
| 6,161,847 A | 12/2000 | Howell et al. | |
| 6,170,910 B1 | 1/2001 | Bapst | |
| 6,209,957 B1 * | 4/2001 | Baloga | B60N 2/2821 297/250.1 |
| 6,272,692 B1 | 8/2001 | Abraham | |
| 6,319,138 B1 | 11/2001 | Fair et al. | |
| 6,325,454 B1 | 12/2001 | Maier | |
| 6,331,032 B1 | 12/2001 | Haut et al. | |
| 6,367,875 B1 | 4/2002 | Bapst | |
| 6,389,607 B1 | 5/2002 | Wood | |
| 6,409,205 B1 | 6/2002 | Bapst et al. | |
| 6,421,840 B1 | 7/2002 | Chen et al. | |
| 6,428,099 B1 | 8/2002 | Kain | |
| 6,431,647 B2 | 8/2002 | Yamazaki | |
| 6,450,576 B1 | 9/2002 | Rhein et al. | |
| 6,457,774 B2 | 10/2002 | Baloga | |
| 6,471,298 B2 | 10/2002 | Carine et al. | |
| 6,474,735 B1 | 11/2002 | Carnahan et al. | |
| 6,513,827 B1 | 2/2003 | Barenbrug | |
| 6,540,292 B2 | 4/2003 | Darling et al. | |
| 6,540,579 B1 | 4/2003 | Gubitosi et al. | |
| 6,561,915 B2 | 5/2003 | Kelly et al. | |
| 6,623,074 B2 | 9/2003 | Asbach et al. | |
| 6,626,489 B2 | 9/2003 | Geis et al. | |
| 6,629,727 B2 | 10/2003 | Asbach et al. | |
| 6,634,708 B2 | 10/2003 | Guenther | |
| 6,666,505 B2 | 12/2003 | Greger et al. | |
| 6,669,302 B2 | 12/2003 | Warner, Jr. et al. | |
| 6,679,550 B2 | 1/2004 | Goor et al. | |
| 6,695,412 B2 | 2/2004 | Barger et al. | |
| 6,705,675 B1 | 3/2004 | Eastman et al. | |
| 6,705,676 B1 | 3/2004 | Berringer et al. | |
| 6,709,062 B2 | 3/2004 | Shah | |
| 6,746,080 B2 | 6/2004 | Tsugimatsu et al. | |
| 6,749,258 B1 | 6/2004 | Leikin | |
| 6,764,133 B2 | 7/2004 | Osato | |
| 6,796,610 B2 * | 9/2004 | Nakagawa | B60N 2/2821 188/371 |
| 6,811,217 B2 | 11/2004 | Kane et al. | |
| 6,820,310 B2 | 11/2004 | Woodard et al. | |
| 6,857,965 B2 | 2/2005 | Pook et al. | |
| 6,877,801 B2 | 4/2005 | Asbach et al. | |
| 6,877,802 B2 | 4/2005 | Christensen et al. | |
| 6,877,809 B2 | 4/2005 | Yamazaki et al. | |
| 6,887,161 B2 | 5/2005 | Mahlstedt et al. | |
| 6,896,575 B2 | 5/2005 | Fair et al. | |
| 6,912,736 B2 | 7/2005 | Moeller et al. | |
| 6,926,359 B2 | 8/2005 | Runk | |
| 6,931,671 B2 | 8/2005 | Skiba | |
| 6,932,709 B1 | 8/2005 | Gubitosi et al. | |
| 7,017,921 B2 | 3/2006 | Eros | |
| 7,044,548 B2 | 5/2006 | Mullen et al. | |
| 7,044,549 B2 | 5/2006 | Maier et al. | |
| 7,062,795 B2 | 6/2006 | Skiba et al. | |
| 7,066,536 B2 | 6/2006 | Williams et al. | |
| 7,188,897 B2 | 3/2007 | Patrizi et al. | |
| 7,195,314 B2 | 3/2007 | Spence et al. | |
| 7,201,444 B2 | 4/2007 | Schimmoller et al. | |
| 7,207,628 B2 | 4/2007 | Eros | |
| 7,234,771 B2 | 6/2007 | Nakhla | |
| 7,244,165 B2 | 7/2007 | Gubitosi et al. | |
| 7,246,855 B2 | 7/2007 | Langmaid et al. | |
| 7,252,342 B2 | 8/2007 | Patrizi et al. | |
| 7,270,373 B2 | 9/2007 | Sakamoto | |
| 7,278,683 B2 | 10/2007 | Williams et al. | |
| 7,278,684 B2 * | 10/2007 | Boyle | B60N 2/2806 297/250.1 |
| 7,322,648 B2 | 1/2008 | Nakagawa | |
| 7,325,871 B2 | 2/2008 | Gangadharan et al. | |
| 7,325,872 B2 | 2/2008 | Basu et al. | |
| 7,328,462 B1 | 2/2008 | Straus | |
| 7,328,941 B2 | 2/2008 | Asbach et al. | |
| 7,338,122 B2 | 3/2008 | Hei et al. | |
| 7,370,912 B2 | 5/2008 | Williams et al. | |
| 7,387,336 B2 | 6/2008 | Sakumoto | |
| 7,438,644 B2 | 10/2008 | Gubitosi et al. | |
| 7,445,228 B2 | 11/2008 | Henry | |
| 7,445,559 B2 | 11/2008 | Kakuda | |
| 7,452,031 B2 | 11/2008 | Woellert et al. | |
| 7,455,353 B2 | 11/2008 | Favorito (nee Wilkins) et al. | |
| 7,467,824 B2 | 12/2008 | Nakhla et al. | |
| 7,472,952 B2 | 1/2009 | Nakhla et al. | |
| 7,472,955 B2 | 1/2009 | Crane et al. | |
| 7,484,801 B2 | 2/2009 | Kassai et al. | |
| 7,488,034 B2 | 2/2009 | Ohren et al. | |
| 7,497,449 B2 | 3/2009 | Logger | |
| 7,506,926 B2 | 3/2009 | Carine | |
| 7,523,984 B2 | 4/2009 | Steininger | |
| 7,536,731 B1 | 5/2009 | Feldman | |
| 7,552,969 B2 | 6/2009 | Maciejczyk | |
| 7,559,606 B2 | 7/2009 | Hei et al. | |
| 7,597,396 B2 | 10/2009 | Longenecker et al. | |
| 7,607,734 B2 | 10/2009 | Clapper et al. | |
| 7,648,199 B2 | 1/2010 | Amesar et al. | |
| RE41,121 E | 2/2010 | Asbach et al. | |
| 7,676,854 B2 | 3/2010 | Berger et al. | |
| 7,695,374 B2 | 4/2010 | Bellows et al. | |
| 7,717,506 B2 | 5/2010 | Amesar et al. | |
| 7,722,118 B2 | 5/2010 | Bapst et al. | |
| 7,726,734 B2 | 6/2010 | Mahal et al. | |
| 7,740,313 B1 | 6/2010 | Hei et al. | |
| 7,765,621 B2 | 8/2010 | Lardeau | |
| 7,765,622 B2 | 8/2010 | Wiles | |
| 7,770,970 B2 | 8/2010 | Hei et al. | |
| 7,770,971 B2 | 8/2010 | Bellows et al. | |
| 7,796,021 B2 | 9/2010 | Saban | |
| 7,798,500 B2 | 9/2010 | Den Boer | |
| 7,798,571 B2 | 9/2010 | Billman et al. | |
| 7,802,320 B2 | 9/2010 | Morgan | |
| 7,802,321 B2 | 9/2010 | Boyd | |
| 7,806,471 B2 | 10/2010 | Nishimoto | |
| 7,806,472 B2 | 10/2010 | Runk et al. | |

(56) References Cited

U.S. PATENT DOCUMENTS

| | | |
|---|---|---|
| 7,810,682 B2 | 10/2010 | Balensiefer et al. |
| 7,832,023 B2 | 11/2010 | Crisco |
| 7,837,275 B2 | 11/2010 | Woellert et al. |
| 7,841,657 B2 | 11/2010 | Nishimoto et al. |
| 7,871,125 B2 | 1/2011 | Asbach et al. |
| 7,887,129 B2 | 2/2011 | Hei et al. |
| 7,891,732 B2 | 2/2011 | Hei et al. |
| 7,930,771 B2 | 4/2011 | Depreitere et al. |
| 7,938,731 B2 | 5/2011 | Papageorge et al. |
| 7,954,895 B2 | 6/2011 | Freeman et al. |
| 7,967,376 B2 | 6/2011 | Przybylo et al. |
| 7,987,525 B2 | 8/2011 | Summers et al. |
| 8,020,220 B2 | 9/2011 | McElroy et al. |
| 8,029,014 B2 | 10/2011 | Ahnert et al. |
| 8,047,608 B2 | 11/2011 | Damiani et al. |
| 8,056,975 B2 | 11/2011 | Longenecker et al. |
| 8,070,226 B2 | 12/2011 | Dingler et al. |
| 8,070,227 B2 | 12/2011 | Brunick et al. |
| 8,087,680 B2 | 1/2012 | Dotsey et al. |
| 8,147,345 B2 | 4/2012 | Furman |
| 8,166,573 B1 | 5/2012 | Chung et al. |
| 8,182,033 B2 | 5/2012 | Hei et al. |
| 8,182,355 B2 | 5/2012 | Bapst |
| 8,197,005 B2 | 6/2012 | Hopke et al. |
| 8,205,940 B2 | 6/2012 | Mahal et al. |
| 8,209,784 B2 | 7/2012 | Nimmons et al. |
| 8,210,610 B2 | 7/2012 | Berkey et al. |
| 8,235,461 B2 | 8/2012 | Cohen |
| 8,235,465 B2 | 8/2012 | Hei et al. |
| 8,240,772 B2 | 8/2012 | Kawata et al. |
| 8,256,840 B2 | 9/2012 | Dasent et al. |
| 8,256,841 B2 | 9/2012 | Hei et al. |
| 8,286,990 B2 | 10/2012 | Tanizaki et al. |
| 8,297,694 B2 | 10/2012 | Arnold, IV et al. |
| 8,308,239 B2 | 11/2012 | Lundeen |
| 8,348,337 B2 | 1/2013 | Franck et al. |
| 8,388,058 B2 | 3/2013 | Krasley |
| 8,393,679 B2 | 3/2013 | Longenecker et al. |
| 8,408,656 B2 | 4/2013 | Carpenter |
| 8,419,129 B2 | 4/2013 | Inoue et al. |
| 8,424,964 B2 | 4/2013 | Campbell et al. |
| 8,430,452 B2 | 4/2013 | Brunick et al. |
| 8,434,827 B2 | 5/2013 | Young et al. |
| 8,449,030 B2 | 5/2013 | Powell et al. |
| 8,459,739 B2 | 6/2013 | Tamanouchi et al. |
| 8,474,907 B2 | 7/2013 | Weber et al. |
| 8,491,401 B2 | 7/2013 | Szymanski |
| 8,500,196 B2 | 8/2013 | Strong et al. |
| 8,511,749 B2 | 8/2013 | Hei et al. |
| 8,534,751 B2 | 9/2013 | Hei et al. |
| 8,540,312 B2 | 9/2013 | Asbach et al. |
| 8,550,556 B2 | 10/2013 | Asbach |
| 8,556,349 B2 | 10/2013 | Welch et al. |
| 8,622,478 B2 | 1/2014 | Spence |
| 8,632,127 B2 | 1/2014 | Brunick et al. |
| 8,640,267 B1 | 2/2014 | Cohen |
| 8,684,456 B2 | 4/2014 | Powell |
| 8,690,237 B2 | 4/2014 | Allen |
| 8,911,015 B2 | 12/2014 | Cohen et al. |
| 2001/0032351 A1 | 10/2001 | Nakayama et al. |
| 2003/0062996 A1 | 4/2003 | Flannagan et al. |
| 2003/0222775 A1 | 12/2003 | Rackham |
| 2004/0250339 A1 | 12/2004 | Musal |
| 2004/0255370 A1 | 12/2004 | Moeller |
| 2005/0030188 A1 | 2/2005 | Flannagan |
| 2005/0200465 A1 | 9/2005 | Fabors et al. |
| 2005/0278834 A1 | 12/2005 | Lee |
| 2006/0059605 A1 | 3/2006 | Ferrara |
| 2006/0059606 A1 | 3/2006 | Ferrara |
| 2006/0162053 A1 | 7/2006 | Lee |
| 2006/0242752 A1 | 11/2006 | Talluri |
| 2006/0277664 A1 | 12/2006 | Akhtar |
| 2007/0040428 A1 | 2/2007 | Sakumoto |
| 2007/0046086 A1 | 3/2007 | Sakumoto |
| 2007/0068282 A1 | 3/2007 | Nakagawa et al. |
| 2007/0080568 A1 | 4/2007 | Nakagawa et al. |
| 2007/0107112 A1 | 5/2007 | Boyd |
| 2007/0119538 A1 | 5/2007 | Price |
| 2007/0130673 A1 | 6/2007 | Wasserkrug |
| 2007/0157370 A1 | 7/2007 | Joubert Des Ouches |
| 2007/0226881 A1 | 10/2007 | Reinhard et al. |
| 2008/0222782 A1 | 9/2008 | Stokes |
| 2009/0026815 A1 | 1/2009 | Amesar et al. |
| 2009/0222964 A1 | 9/2009 | Wiles |
| 2009/0315299 A1 | 12/2009 | Barenbrug |
| 2010/0033000 A1* | 2/2010 | Singh .................. B60N 2/2806 297/250.1 |
| 2011/0047678 A1 | 3/2011 | Barth et al. |
| 2011/0089728 A1* | 4/2011 | Wuerstl .................. B60N 2/28 297/216.11 |
| 2011/0107503 A1 | 5/2011 | Morgan |
| 2011/0179557 A1 | 7/2011 | Rabie |
| 2011/0203024 A1 | 8/2011 | Morgan |
| 2011/0272925 A1 | 11/2011 | Dijkstra |
| 2012/0013157 A1 | 1/2012 | Keegan et al. |
| 2012/0060251 A1 | 3/2012 | Schimpf |
| 2012/0151663 A1 | 6/2012 | Rumbaugh |
| 2012/0186002 A1 | 7/2012 | Bhatnagar et al. |
| 2012/0216339 A1 | 8/2012 | Nimmons et al. |
| 2012/0233745 A1 | 9/2012 | Veazie |
| 2013/0125294 A1 | 5/2013 | Ferrara |
| 2013/0340147 A1 | 12/2013 | Giles |

OTHER PUBLICATIONS

Children Injured in Motor Vehicle Traffic Crashes, NHTSA, May 2010, DOT HS 811 325.
U.S. Appl. No. 62/043,947, filed Aug. 29, 2014, Cohen et al.
U.S. Appl. No. 62/043,955, filed Aug. 29, 2014, Cohen et al.
U.S. Appl. No. 62/160,185, filed May 12, 2015, Cohen et al.
Helmets Preventing Concussion Seen Quashed by NFL-Riddell, John Helyar, Mar. 18, 2013, Bloomberg.

* cited by examiner

CAR SEAT VEHICLE CONNECTION SYSTEM, APPARATUS, AND METHOD

CROSS-REFERENCE TO RELATED APPLICATIONS

This application is claims priority from U.S. Patent Application No. 62/043,955 (Cohen et al.) filed Aug. 29, 2014, the entire contents of which are hereby incorporated herein by reference.

BACKGROUND

1. Field

The present invention relates to connection arrangements between a removable car seat and a vehicle, such as a car. For purposes herein, the term "car seat" is to be understood broadly to include child safety seats.

2. State of the Art

Every year, thousands of young children are killed or injured in crashes, mainly because 3 out of every 4 children in child safety seats are not properly secured, or even worse, not restrained at all. To address the problem of improper car seat installation, various industry-wide standards have been adopted. However, such standards introduce their own difficulties for installing car seats in vehicles, as described below.

ISOFIX is the international standard for attachment points for child safety seats in passenger cars. The system has other regional names including LATCH ("Lower Anchors and Tethers for Children") in the United States and LUAS ("Lower Universal Anchorage System") or Canfix in Canada. It has also been called the "Universal Child Safety Seat System" or UCSSS.

ISOFIX is described in International Organisation for Standardisation standard ISO 13216, which specifies the anchoring system for Group 1 child safety seats. It defines standard attachment points to be manufactured into cars, enabling compliant child safety seats to be safely secured. ISOFIX is an alternative to securing the seat with seat belts. Seats are secured with a single attachment at the top (top tether) and two attachments at the base of each side of the seat. The full set of anchor points for this system were required in new cars in the United States starting in September 2002.

In the European Union (EU) the car seat connection system is known as ISOFIX and covers both Group 0/0+ and Group 1 child safety seats. The mechanism for attaching the seat to the lower anchors is quite different from that in the United States. In the EU two "alligator-like" clips connect the seat to the lower anchors rather than the open clip style connectors commonly used in the United States. However, some car seat manufactures are beginning to offer true ISOFIX type attachments in the U.S. In the EU standard, there are also various installation categories: "universal", "vehicle-specific" and "semi-universal". The main differences are that "Universal" represents use of a top tether strap with the ISOFIX anchorage, "vehicle-specific" represents the usage of the ISOFIX anchorage without the top tether in specified vehicles only, while "Semi-Universal" represents usage of the ISOFIX anchorage together with a "foot-prop".

ISOFIX is designed to secure a maximum combined weight (weight of both seat and child) of 65 lbs (29.54 kgs). The center-to-center distance between the anchors of ISOFIX (and also LATCH) systems is 11 inches (280 mm).

For a typical rear facing car seat that includes a base that is separate from the car seat, when the car seat base is uninstalled from the vehicle, the base and associated connection straps and quick-connect connectors remain connected to the base, not to the vehicle. Therefore, upon reinstallation of the base to the vehicle, a user must locate the car seat anchors, which are often obscured in a difficult-to-access location between the vehicle seat bottom and the backrest. Thus, connecting, removing, and reconnecting the base to the vehicle, even using quick-connect connectors and car seat anchors, can be time consuming and difficult to perform for some users.

SUMMARY

According to a first embodiment, a car seat connection system is described for connecting the car seat to a vehicle. The system includes a seat connector extending from the car seat and a strap. The strap has a first connector at a first end of the strap and a second connector at a second end of the strap. The first connector is configured to easily and quickly removably connect to the seat connector and the second connector is configured to easily and quickly removably connect to the vehicle.

According to a second embodiment, a method is described for removably connecting a car seat to a vehicle. The method includes providing a car seat having a seat connector extending from the car seat. Also, the method includes providing a strap having a first connector at a first end of the strap and a second connector at a second end of the strap. The first connector is configured to removably connect to the seat connector and the second connector is configured to removably connect to the vehicle. Also, the method includes connecting the first connector to the seat connector and connecting the second connector to the vehicle.

According to a third embodiment, a method is described for disconnecting the car seat that is connected in accordance with the second embodiment. The method includes disconnecting the first connector of the strap from the seat connector.

DETAILED DESCRIPTION

Figure 1:
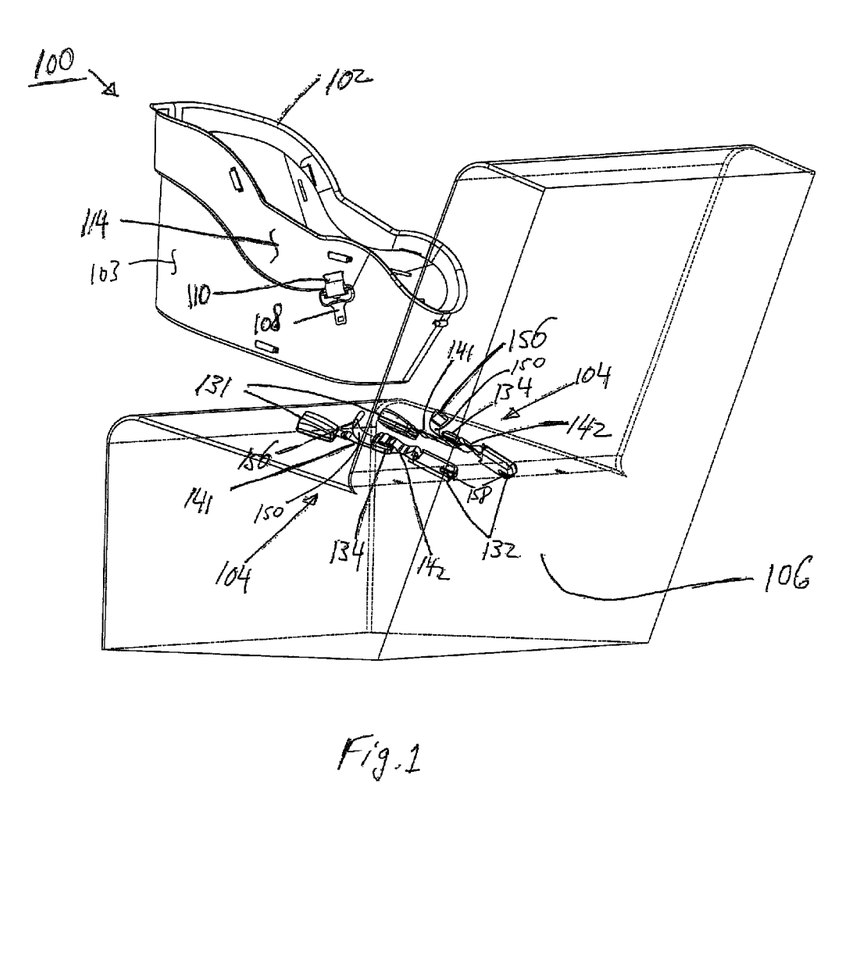
FIG. 1 is an assembly view of a car seat connection system in accordance with an embodiment of the invention.

FIG. 1 is an assembly view of a preferred embodiment of a car seat connection system 100. The system 100 includes a car seat 102 and distal webs or straps 104 which are constructed to removably connect the car seat 102 to a vehicle car seat anchor 158 (hereinafter referred to as "anchor 158"). The car seat 102 is configured with seat connectors 108 of a first type. In one embodiment, the seat connectors 108 are male seatbelt connectors, such as automotive seatbelt connectors, that are connected to the car seat 102 via proximal short webs or straps 110. (For purposes herein, the terms "distal" and "proximal" are used as terms that relate to relative distances from the car seat, with the "distal" strap being further from the car seat than the "proximal" strap.) Although only one male seatbelt connector 108 is shown in FIG. 1, a second seatbelt connector 108 and an associated strap 110 are located on an opposite side of the seat from that shown in FIG. 1.

Figure 2:
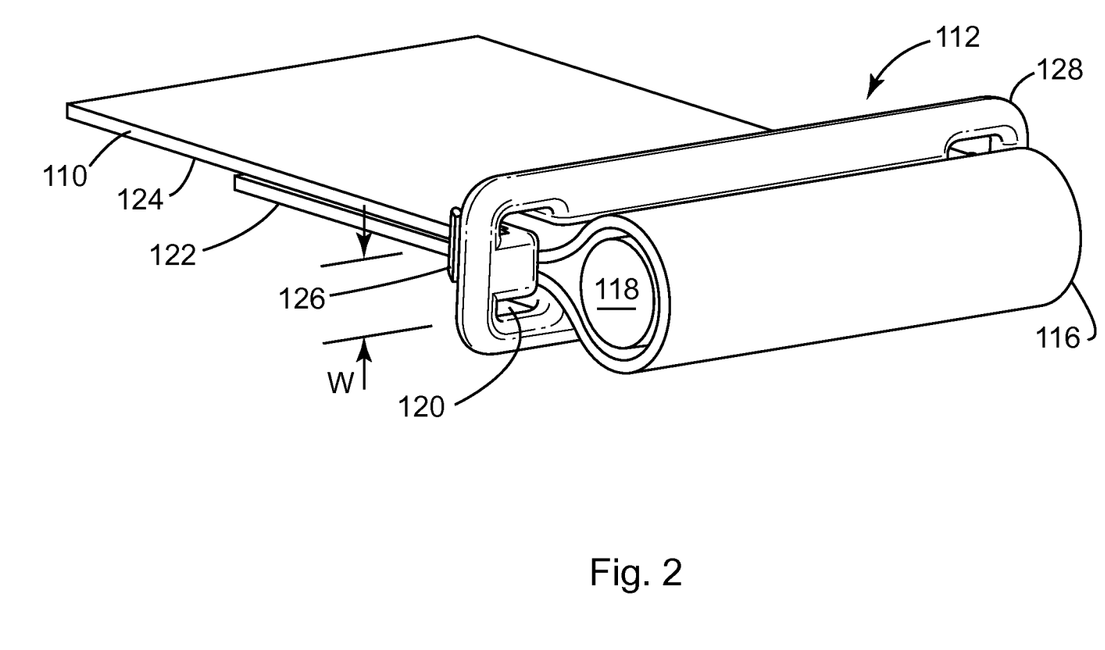
FIG. 2 shows an exploded isometric view of a portion of a strap connected to a seat connector of the car seat shown in FIG. 1.
Figure 3:
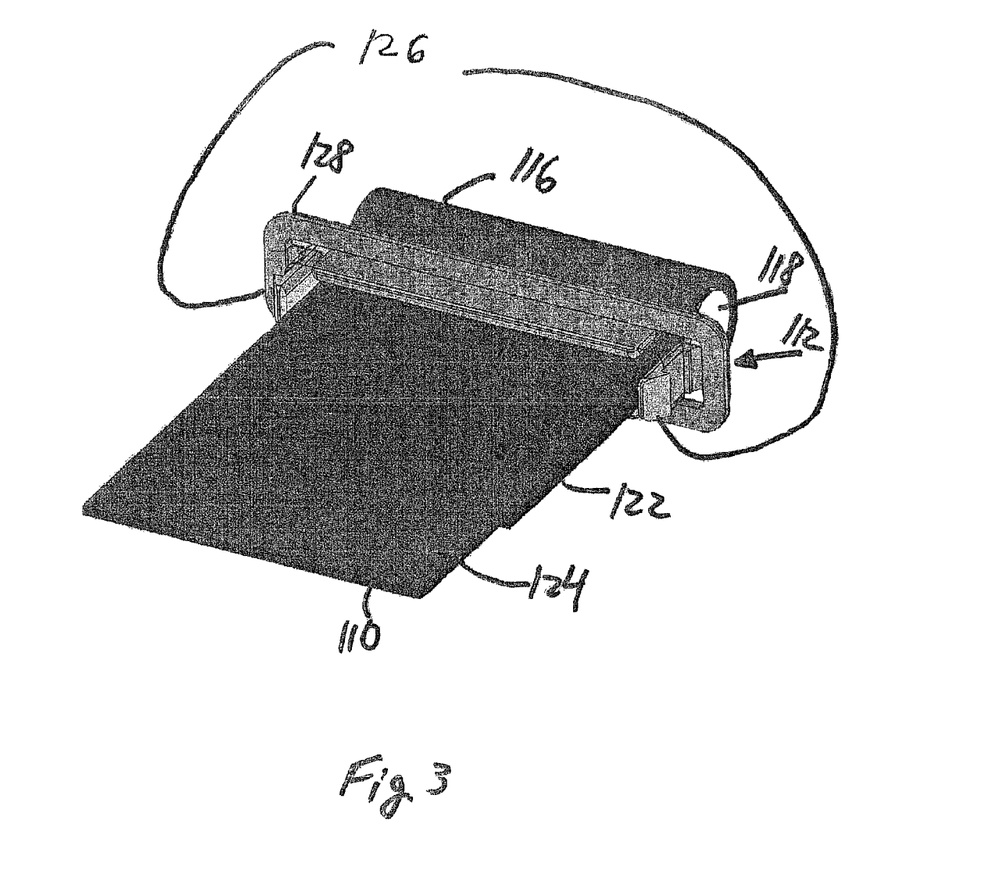
FIG. 3 is an exploded isometric view of the strap shown in FIG. 2, viewed from an opposite direction to that in FIG. 2.

In the embodiment shown in FIGS. 1 to 5, the proximal short straps 110 extend through grommets 112 attached to an outer wall 114 of a base or shell 103 (FIGS. 1, 4, 5) of the car seat 102. For example, FIGS. 2 and 3 show an example of a rectangular grommet 112 through which a loop 116 of the proximal strap 110 extends. The proximal strap 110 is wrapped around a pin 118 or dowel, which has a diameter that is larger than a width "W" of an opening 120 of the grommet 112 in order to retain the loop 116 of the strap 110 on one side of the grommet 112, i.e., on an inner side of the outer wall 114 of the car seat 102. One end 122 of the strap 110 is fastened to a major portion 124 of the strap 110, such as with thread, rivets, or other fastening means. Preferably, the pin or dowel 118 is securely fastened to the loop 116 so that the proximal strap 110 cannot be disconnected from the car seat 102.

In one embodiment shown most clearly in FIG. 3, the grommet 112 has a pair of resilient snap fit tabs 126 that snap onto or otherwise engage with an opening (not shown) formed in the outer wall 114 of the car seat 102 to retain the outer wall 114 of the car seat 102 between the tabs 126 and a bezel 128 of the grommet 112.

The distal straps 104 include a first connector 131 of a first type at a first end and a second connector 132 of a second type at a second, opposite end. The distal straps 104 also include an adjuster 134 that is connected to the first connector 131 and the second connector 132 with respective webs or straps 141, 142. The adjuster 134 may be constructed in accordance with the disclosure of U.S. Pat. No. 6,820,310 (Woodard et al.), the entire contents of which are hereby incorporated herein by reference. Specifically, a first web or strap 141 connects the first connector 131 to the adjuster 134 and a second web or strap 142 connects the adjuster 134 to the second connector 132. The second strap 142 is fixedly connected to the adjuster 134, while the first strap 141 is adjustably connected to the adjuster 134. A free end 150 of the first strap 141 is passed through an adjuster mechanism (not shown) of the adjuster 134. The adjustment mechanism has an automatic retention feature such that pulling on the free end 150 of the first strap 141 away from the adjuster 134 tends to shorten the distance between the first connector 131 and the adjuster 134. Also, the adjuster mechanism is constructed to retain the first strap 141 at an adjusted position when the free end 150 of the first strap 141 is released. Moreover, the adjuster mechanism includes a release button 154, which while depressed, permits relative movement between the first strap 141 and the adjuster 134 to allow the distance between the adjuster 134 and the first connector 131 to be increased. For example, while the release button 154 is depressed, the first connector 131 can be pulled away from the adjuster to increase the distance between the first connector 131 and the adjuster 134.

Figure 4:
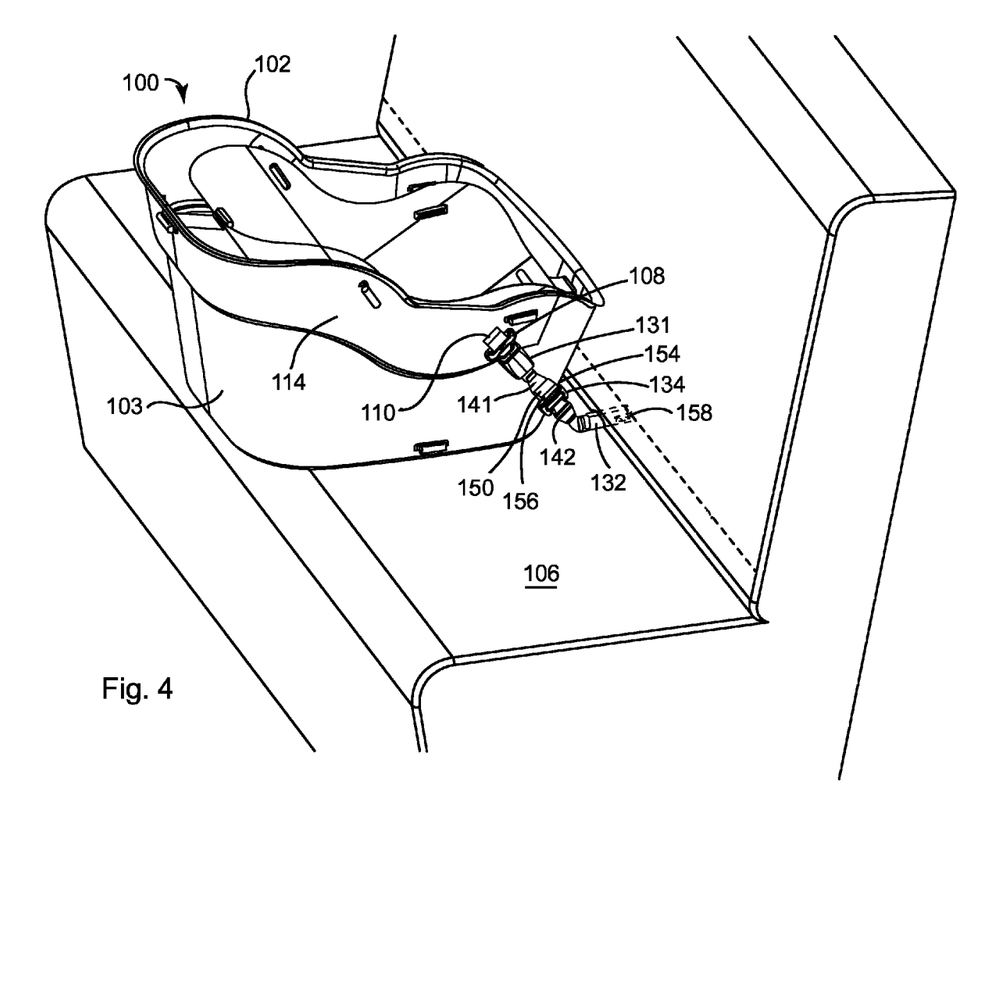
FIG. 4 is a view of the system shown in FIG. 1 in a connected configuration.
Figure 5:
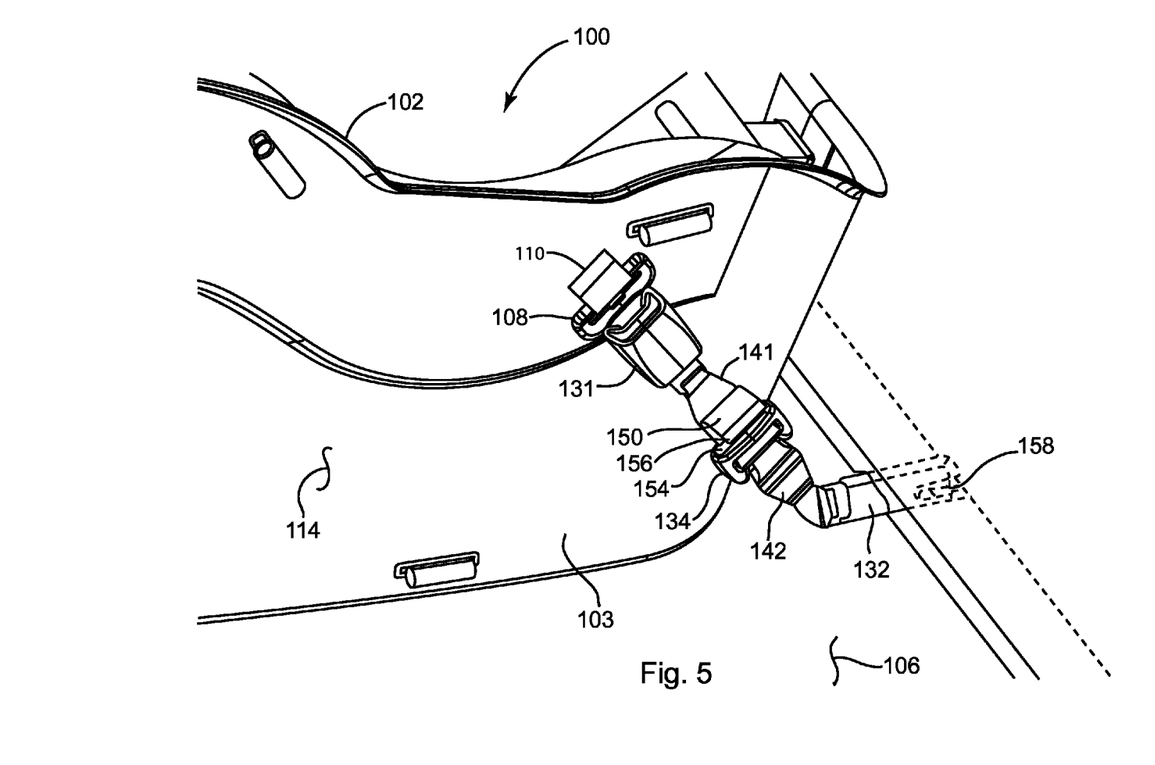
FIG. 5 is an exploded view of a portion of the system shown in FIG. 4.

In the embodiment shown in FIGS. 1, 4, and 5, the first connector 131 of the distal strap 104 is a female seatbelt connector, such as an automotive seatbelt connector and the second connector 132 of the strap 104 is a quick-connect car seat connector (hereinafter referred to as a "quick-connect connector"), such as a LATCH or ISOFIX connector. In the shown embodiment, the quick-connect connector 132 is attached to the adjuster 134 via a non-adjustable web or strap 142, while the female seatbelt connector 131 is attached to the adjuster 134 via an adjustable web or strap 141 that has a free end 150 that is routed through the adjustment mechanism of the adjuster 134. The free end 150 of the strap 141 can be provided with a loop 156 for a user to grab, such as with a finger, to pull on the strap 141 toward the male seatbelt connector 108 during installation, as discussed in greater detail hereinbelow. The quick-connect connector 132 is constructed to couple to a car seat anchor 158 (FIG. 5), such as a LATCH or ISOFIX anchor, of the vehicle. The female seatbelt connector 131 is constructed to removably couple to the male seatbelt connector 108 extending from the car seat 102.

In use, to secure the car seat 102 to the vehicle, the quick-connect connector 132 of each distal strap 104 is coupled to a corresponding car seat anchor 158 of the vehicle. The car seat 102 is placed on the vehicle seat 106 as shown in FIG. 4 and the female seatbelt connectors 131 of the distal straps 104 and the respective male seatbelt connectors 108 of the car seat 102 are connected to each other. The free ends 150 of the straps 141 are then pulled in a direction toward the male seatbelt connectors 108 to tighten the distal straps 104 and remove excess slack therein, thereby securing the car seat 102 firmly against the vehicle seat 106. To disconnect the car seat 102 from the vehicle, the male seatbelt connector 108 is disconnected from the female seatbelt connector 131 of the distal strap 104. The car seat 102 may then be lifted from the vehicle seat 106. The distal straps 104 may remain attached by their quick-connect connectors 132 to the car seat anchors 158 of the vehicle. As a result, a user who wishes to regularly remove the car seat 102 from the vehicle does not have to repeatedly locate and reconnect the quick-connect connectors 132 to the car seat anchors 158 of the vehicle, which, as mentioned herein, are often obscured and hard to reach in some vehicles. Thus, the system and methods described herein facilitate quick, easy, and correct installation and removal of a car seat from a vehicle.

Figure 6:
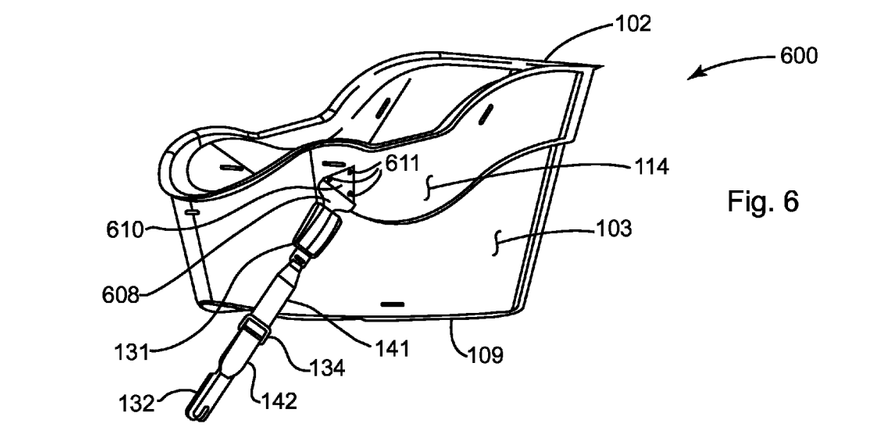
FIG. 6 is an isometric view of a car seat connection system in accordance with another embodiment of the invention.
Figure 7:
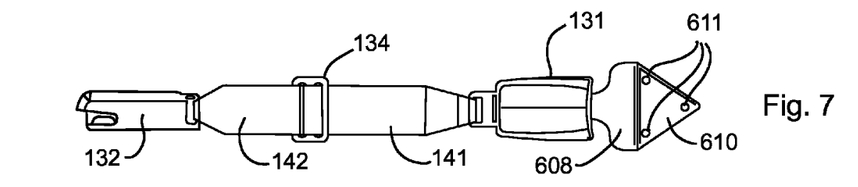
FIG. 7 shows a portion of the car seat connection system shown in FIG. 6.
Figure 8:
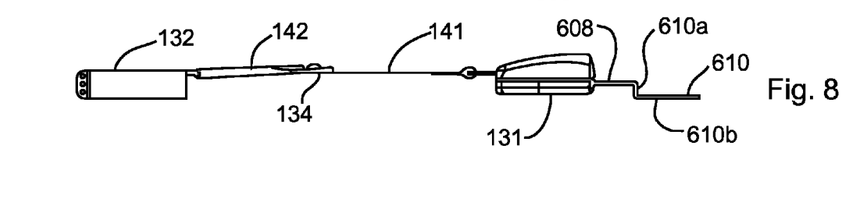
FIG. 8 is a side elevation view of the portion of the car seat connection system shown in FIG. 7.

An alternative embodiment to the car seat connection system 100 shown in FIG. 1 is shown with reference to FIGS. 6 to 8, in which like reference numbers correspond to like elements. A car seat connection system 600 shown in FIG. 6 differs from system 100 that is shown in FIG. 1 in that the car seat connector 608 of system 600 is connected to the wall 114 of the car seat 102 with a flange 610 instead of the flexible strap 110 of system 100. The flange 610 can be fastened to the wall 114 with mechanical fasteners (not shown), such as rivets, screws, bolts, etc. through holes 611 (FIGS. 6 and 7) in the flange 610. It will be appreciated however, that other fastening means may also be used to secure the flange 610 to the wall 114. In the embodiment shown in FIG. 6, the flange 610 is secured to the car seat 102 so that the car seat connector 608 extends at fixed angle with respect to a bottom 109 of the car seat 102. However, in other embodiments, the flange 610 can be fastened, such as with a single rivet (not shown), to the wall 114 so that the flange 610 can pivot with respect to the car seat 102 to adjust the angle between car seat connector 608 and the bottom 109 of the car seat 102.

FIG. 7 shows a portion of the car seat connection system 600 shown in FIG. 6, and FIG. 8 is a side elevation view of the portion of the car seat connection system 600 shown in FIG. 7. As shown in FIGS. 7 and 8, the car seat connector 608 is integrally formed with the flange 610 and does not rotate or flex with respect to the flange 610. However, in other embodiments, the car seat connector 608 may be connected to the flange 610 with a hinged or flexible connection that permits relative rotation between the car seat connector 608 and the flange 610. Also, as shown in FIG. 8, the flange 610 may have a bend 610a that disposes the car seat connector 608 so that car seat connector 608 is not coplanar with a main portion 610b of the flange 610. Such positioning of the car seat connector 608 provides clearance between female seatbelt connector 131 and the wall 114.

Figure 9:
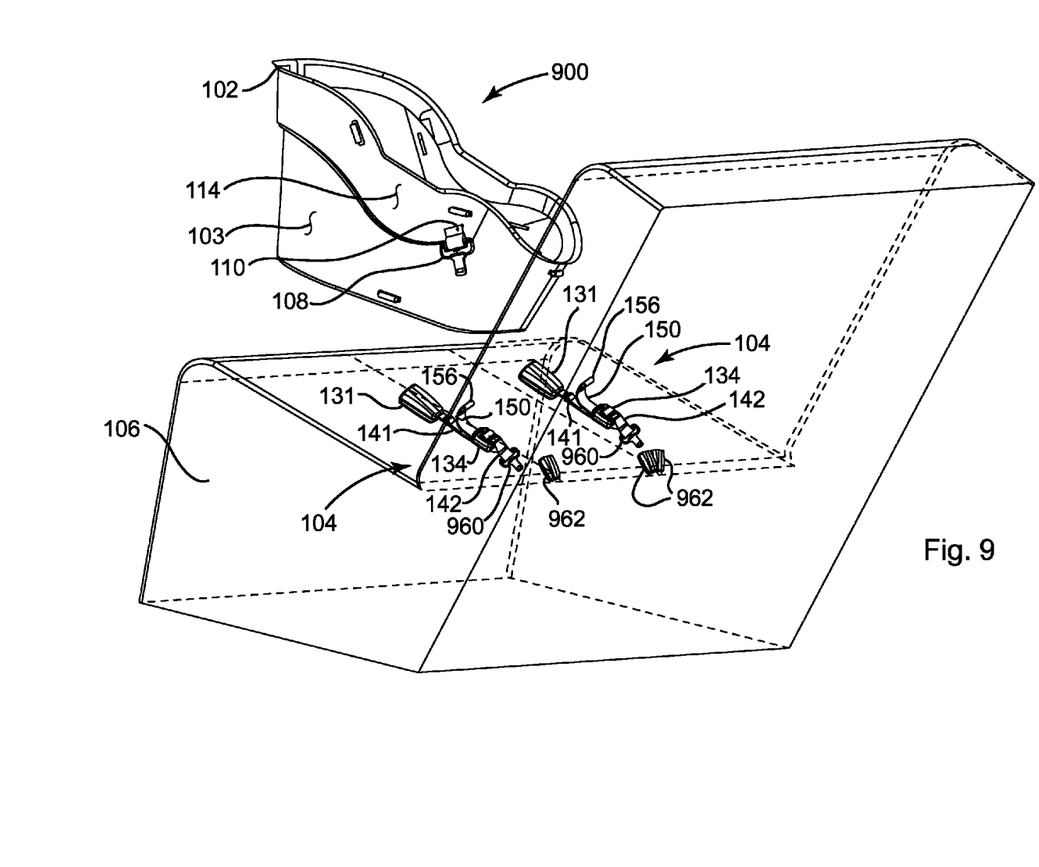
FIG. 9 is an assembly view of a car seat connection system in accordance with another embodiment of the invention.
Figure 10:
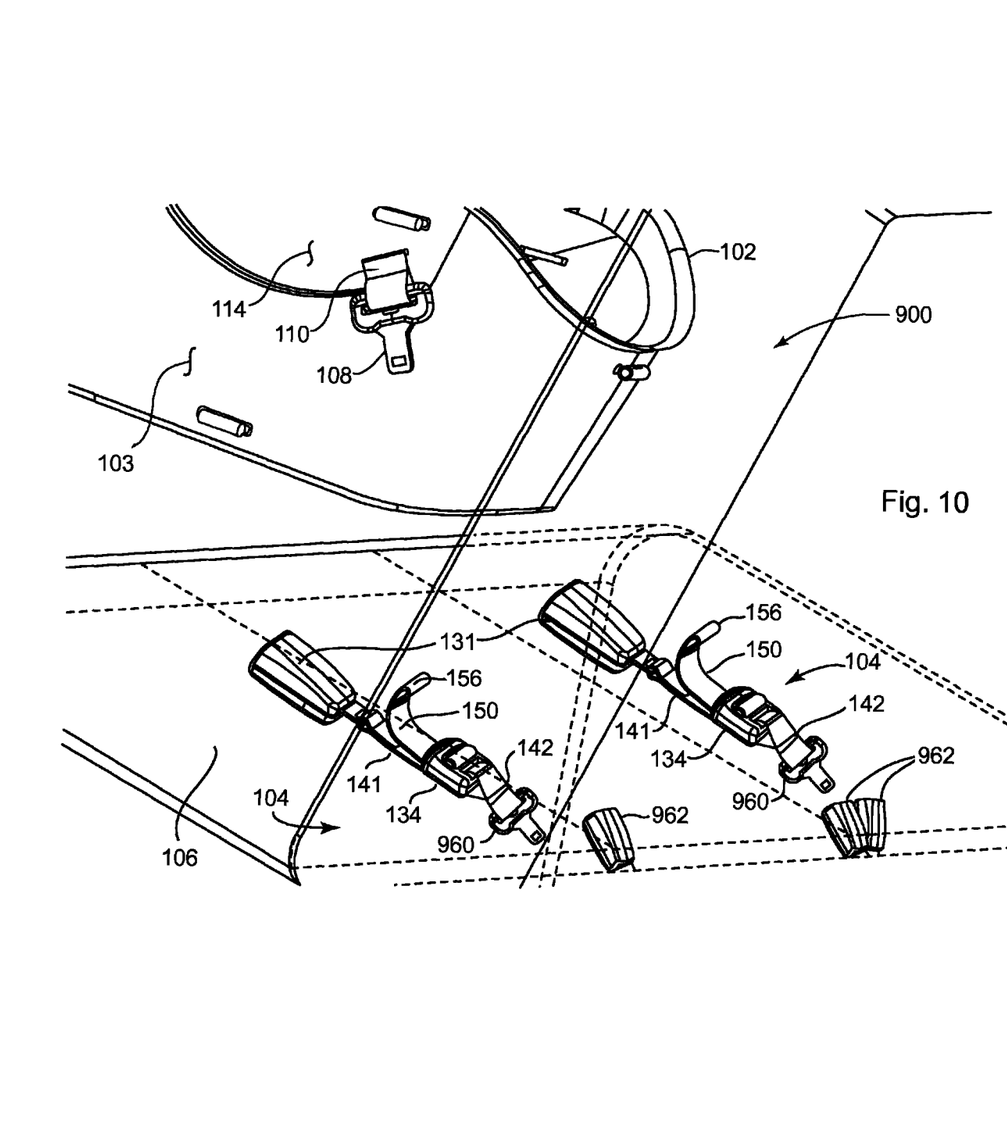
FIG. 10 an exploded view of a portion of the seat connection system shown in FIG. 9.

Another alternative embodiment to the car seat connection system 100 shown in FIG. 1 is shown with reference to FIGS. 9 and 10, in which like reference numbers correspond to like elements. A car seat connection system 900 shown in FIGS. 9 and 10 has a different connector arrangement in distal straps 104 as compared to distal straps 104 of system 100 shown in FIG. 1. Specifically, the distal straps 104 of system 900 include a male seatbelt connector 960 at a second end of the straps 104. Each male seatbelt connector 960 removably connects to one of the female seatbelt connectors 962 of the vehicle. Other than the differences noted above between systems 100 and 900, the construction of the straps 104 shown in FIGS. 9 and 10 is the same as the straps 104 shown in FIG. 1. Also, it will be appreciated that the straps 104 of system 900 can be used to connect to the car seat connector 608 of the system 600 via seat belt connectors 131, which are in common with systems 900 and 600.

In use, to secure the car seat 102 to the vehicle with the straps 104 of system 900, the male seatbelt connector 960 of each distal strap 104 is connected to a corresponding female seatbelt connector 962 of the vehicle. The car seat 102 is placed on the vehicle seat 106 and the female seatbelt connectors 131 of the distal straps 104 and the respective male seatbelt connectors 108 of the car seat 102 are connected to each other. The free ends 150 of the straps 141 are then pulled in a direction toward the male seatbelt connectors 108 to tighten the distal straps 104 and remove excess slack therein, thereby securing the car seat 102 firmly against the vehicle seat 106. To disconnect the car seat 102 from the vehicle, the male seatbelt connector 108 is disconnected from the female seatbelt connector 131 of the distal strap 104. The car seat 102 may then be lifted from the vehicle seat 106. The distal straps 104 may remain attached by their male seatbelt connectors 960 to the female seatbelt connectors 962 of the vehicle. As a result, a user who wishes to regularly remove the car seat 102 from the vehicle that does not have car seat anchors 158 can connect the car seat 102 to the vehicle using the vehicle's own seatbelt connectors 962 and the user does not have to repeatedly locate and reconnect the male seatbelt connectors 960 to the female seatbelt connectors 962 of the vehicle, which are often obscured and hard to reach in some vehicles, especially when the car seat 102 is placed on the vehicle seat 106 near the female seatbelt connectors 962. Thus, the system and methods described herein facilitate quick, easy, and correct installation and removal of a car seat from a vehicle.

There have been described and illustrated herein several embodiments of a connection system and a method of connecting a car seat to a vehicle. While particular embodiments have been described, it is not intended that the claims be limited thereto, as it is intended that the claims be as broad in scope as the art will allow and that the specification be read likewise. Thus, while particular types of connectors and couplers have been disclosed, it will be appreciated that other connectors and couplers can be used as well. For example, and not by way of limitation, in other embodiments, instead of employing a seatbelt connector on each strap, it will be appreciated that straps may be formed having quick-connect connectors, such as LATCH or ISOFIX connectors, at both ends and anchors, such as LATCH or ISOFIX anchors, integrated into the car seat in place of the male seatbelt connector. Also, while a male seatbelt connector was described as extending from the car seat and a female seatbelt connector was described as included with the strap, it will be recognized that in alternate embodiments, the gender of those seatbelt connectors can be reversed. It will therefore be appreciated by those skilled in the art that yet other modifications could be made to the provided invention without deviating from its spirit and scope as claimed.

What is claimed is:

1. A car seat for connection to a vehicle seat, comprising:
a base for supporting a seat;
at least one car seat connector connected to said base; and
at least one strap removably connected to each of said at least one car seat connector, wherein each strap comprises:
an adjuster;
a first elongated webbing extending from the adjuster to a first end;
a second elongated webbing extending from the adjuster to a second end;
a first connector at the first end of said first webbing, said first connector configured to removably connect to said car seat connector of said car seat, and
a second connector at the second end of said second webbing, said second connector configured to removably connect to a seatbelt connector of a vehicle,
wherein said at least one car seat connector and said at least one first connector are seatbelt connectors of opposite gender, and said at least one second connector of said strap is a seatbelt connector having a gender that is opposite said gender of said first connector and a gender of said vehicle seatbelt connector, and
wherein said adjuster is disposed in spaced relation to and between said first end of said first webbing and said second end of said second webbing, said adjuster constructed to adjust the length of said strap between said first and second connectors.

2. The car seat according to claim 1, wherein:
each car seat connector is connected to another strap that is fixed at one end to an outer wall of the base of the car seat.

3. The car seat according to claim 1, wherein:
each car seat connector extends from a flange that is secured to an outer wall of the base of the car seat.

4. The car seat according to claim 1, wherein:
each said car seat connector is affixed to an outer wall of said base of the car seat.

* * * * *